United States Patent
Yokose

(10) Patent No.: US 10,748,306 B2
(45) Date of Patent: Aug. 18, 2020

(54) ENCODING DEVICE, DECODING DEVICE, AND NON-TRANSITORY COMPUTER READABLE MEDIUM

(71) Applicant: FUJI XEROX CO., LTD., Tokyo (JP)

(72) Inventor: Taro Yokose, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/051,898

(22) Filed: Aug. 1, 2018

(65) Prior Publication Data
US 2019/0287273 A1 Sep. 19, 2019

(30) Foreign Application Priority Data

Mar. 19, 2018 (JP) .................................. 2018-050543
Mar. 19, 2018 (JP) .................................. 2018-050732

(51) Int. Cl.
*G06T 17/00* (2006.01)
*G06T 9/00* (2006.01)
(Continued)

(52) U.S. Cl.
CPC .............. *G06T 9/001* (2013.01); *B33Y 50/00* (2014.12); *G06T 15/08* (2013.01)

(58) Field of Classification Search
CPC ......... G06T 15/08; G06T 17/00; G06T 19/00; G06T 15/06; G06T 15/40
(Continued)

(56) References Cited

U.S. PATENT DOCUMENTS 5,566,284 A   10/1996 Wakayama
5,828,789 A   10/1998 Yokose et al.
(Continued)

FOREIGN PATENT DOCUMENTS

JP   H07-230555 A   8/1995
JP   2888186 B2    5/1999
(Continued)

OTHER PUBLICATIONS

Takahashi et al. "The Next-Generation 3D Printing Data Format FAV, Which Enables an Unprecedented Wide Range of Expression." Fuji Xerox Technical Report, No. 26, pp. 50-57, 2017,<http://www.fujixerox.co.jp/company/technical/tr/2017/>.
(Continued)

*Primary Examiner* — Gordon G Liu
(74) *Attorney, Agent, or Firm* — Oliff PLC

(57) ABSTRACT

An encoding device includes an extracting unit that extracts, from voxel data expressing a three-dimensional shape by a collection of voxels arranged at lattice positions in a space, (i) structure information indicating presence/absence of a voxel at each lattice position and (ii) attribute information including an attribute value of each voxel; a structure encoding unit that encodes the structure information by determining a structure code corresponding to the structure information on a structure element having at least lattice position according to first context information indicating presence/absence of voxel at at least one predetermined lattice position around the structure element; and an attribute encoding unit that encodes an attribute value of a voxel of interest into an attribute code using second context information indicating presence/absence of a voxel at at least one predetermined lattice position around the voxel of interest.

17 Claims, 12 Drawing Sheets

(51) Int. Cl.
*B33Y 50/00* (2015.01)
*G06T 15/08* (2011.01)

(58) Field of Classification Search
USPC .......................................................... 345/424
See application file for complete search history.

(56) References Cited

U.S. PATENT DOCUMENTS

| | | | |
|---|---|---|---|
| 6,636,642 B1 | 10/2003 | Yokose | |
| 2005/0180340 A1 | 8/2005 | Lee | |
| 2007/0206007 A1* | 9/2007 | Taubin ...................... | G06T 9/00 345/423 |
| 2011/0029546 A1* | 2/2011 | Mineno ................. | G06F 16/258 707/756 |
| 2017/0221254 A1* | 8/2017 | Zar .......................... | G06T 17/00 |
| 2017/0347122 A1* | 11/2017 | Chou ....................... | H04N 19/60 |
| 2019/0180499 A1* | 6/2019 | Caulfield ............... | G01C 21/20 |

FOREIGN PATENT DOCUMENTS

| | | |
|---|---|---|
| JP | 2005-235210 A | 9/2005 |
| JP | 3885413 B2 | 2/2007 |

OTHER PUBLICATIONS

Morishita et al. "Volume Data Compression Using Three-Dimensional Discrete Cosine Transform". Information Processing Society Research Report Graphics and CAD (CG), 1995(63(1995-CG-075), pp. 9-16, 1995.

Haruyama et al. "Volume Data Compression Using Vector Quantization and Discrete Cosine Transform." The Institute of Image Information and Television Engineers Winter Convention Proceedings, pp. 90, 2001.

* cited by examiner

ENCODING DEVICE, DECODING DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-050543 filed Mar. 19, 2018 and Japanese Patent Application No. 2018-050732 filed Mar. 19, 2018.

BACKGROUND

(i) Technical Field

The present invention relates to an encoding device, a decoding device, and a non-transitory computer readable medium.

(ii) Related Art

Three-dimensional manufacturing devices such as 3D printers (three-dimensional printing machines) are distributed. As a data format for a 3D printer, a format in which a three-dimensional shape is described by mesh representation of a polygon, such as a STL (Standard Triangulated Language) format or a 3DS format, is widely used.

In addition, the applicant proposes a data format called "FAV" which describes a three-dimensional model to be modeled with a 3D printer by voxel representation ("The Next-Generation 3D Printing Data Format FAV, Which Enables an Unprecedented Wide Range of Expression," Tomonari Takahasi and Masahiko Fujii, Fuji Xerox Technical Report, No. 26, Apr. 27, 2017). In the FAV format, various properties can be expressed in addition to a three-dimensional shape by making voxels have various attributes such as color, material, link strength with other voxels, and the like.

As can be inferred from the fact that the amount of data of a bitmap representation of a two-dimensional full color image becomes enormous, when a voxel has various attributes, particularly colors, the amount of data in a voxel form (referred to as voxel data) expressing a three-dimensional shape become very enormous. Therefore, there is a need for an encoding method capable of reducing the amount of voxel data.

JP-B-2888186 and JP-B-3885413 disclose encoding methods for reducing the data amount of a two-dimensional image. These methods use a predictive encoding method that predicts a value of a pixel of interest from values of pixels in the neighborhood of the pixel of interest to provide predictors corresponding to the neighboring pixels, and encode the value of the pixel of interest based on identification information of a predictor that correctly predicted the value of the pixel of interest.

Unlike three-dimensional voxel data formed by CT (Computed Tomography) or the like, voxel data expressing a three-dimensional shape to be modeled has the characteristic of sparseness. That is, a three-dimensional shape to be modeled generally occupies only a part of the three-dimensional space which defines the three-dimensional shape, and the lattice positions of the normal individual lattices which delimit the three-dimensional space include positions where voxels (a part of the three-dimensional shape) exist and positions where no voxels exist. Therefore, if an encoding method applied to a two-dimensional image in which pixels are densely arranged is merely diverted, a high encoding efficiency may not be expected.

JP-A-2005-235210 discloses a method of encoding three-dimensional volume data including voxel data. This encoding method includes a step of converting three-dimensional volume data including at least one of point texture data, voxel data or octree data into adaptive octree data in which a predetermined label is given to an intermediate node, a step of encoding nodes of the adaptive octree, and a step of generating a bit stream from data obtained by the encoding in the step of encoding the nodes of the adaptive octree. The paragraph [0072] of this document describes that depth information and color information are separately encoded for a P node among nodes obtained by equally dividing a volume step by step, and, for the depth information, a combination of values of neighboring voxels in the same layer and immediately below layer of a voxel of interest is used as a context to perform PPM coding, which is one type of predictive encoding.

JP-A-07-230555 discloses a method in which the original texture image stored in a storage medium is spatially transformed to spatial frequency image data by a discrete cosine transforming unit. A polygon calculating unit calculates the size of a polygon and calculates the resolution ratio of a texture to be pasted. A spatial low pass filter filters a low frequency band of the spatial frequency image data at the cutoff frequency corresponding to the resolution ratio of the texture. The filtered spatial frequency image data is inversely spatially transformed and then reduced to a mipmap image of a predetermined size.

There has been proposed a technique for performing a frequency conversion such as the DCT (Discrete Cosine Transform) or the like on volume data obtained by the CT (Computed Tomography) or the like and cutting a high frequency component of the conversion result, thereby reducing the data amount ("Volume Data Compression Using Three-Dimensional Discrete Cosine Transform," Hiroyuki Morishita and Yoshio Ohno, Information Processing Society Research Report Graphics and CAD (CG), 1995(63(1995-CG-075), Jul. 14, 1995; and "Volume Data Compression Using Vector Quantization and Discrete Cosine Transform," Koichi HARUYAMA and Nobuyuki UMEZU, The Institute of Image Information and Television Engineers Winter Convention Proceedings (2001), 90, Dec. 6, 2001).

SUMMARY

An aspect of non-limiting embodiments of the present disclosure relate to improving the encoding efficiency of the entire voxel data as compared with a method of encoding structure information indicating presence/absence of voxels based on context information while encoding voxel attribute values without using the context information.

Modeling data expressing a three-dimensional shape manufactured by a 3D printer or the like is sparse. That is, there are many lattice positions having no three-dimensional shape in the lattice positions of the coordinate system defining the three-dimensional shape. In a case where lossy compression is simply performed on such modeling data, when the compressed data is decoded, a so-called mosquito noise may occur in the neighborhood of the boundary between a region where a three-dimensional shape exists and a region where no three-dimensional shape exists, and a value indicating the attribute of the three-dimensional shape may appear at a lattice position in the region where no three-dimensional shape exists. When an object (three-dimensional shape) is manufactured using such decoded data, a part of the three-dimensional shape may be manufactured at a position where the three-dimensional shape does not originally exist.

Another aspect of non-limiting embodiments of the present disclosure relate to providing a mechanism capable of cutting noise in a region where no three-dimensional shape originally exists even when three-dimensional data representing a three-dimensional shape is compressed in a lossy manner and decompressed (decoded).

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an encoding device including: an extracting unit that extracts, from voxel data expressing a three-dimensional shape by a collection of voxels arranged at lattice positions in a space, (i) structure information indicating presence/absence of a voxel at each lattice position and (ii) attribute information including an attribute value of each voxel; a structure encoding unit that encodes the structure information by determining a structure code corresponding to the structure information on a structure element having at least lattice position according to first context information indicating presence/absence of voxel at at least one predetermined lattice position around the structure element; and an attribute encoding unit that encodes an attribute value of a voxel of interest into an attribute code using second context information indicating presence/absence of a voxel at at least one predetermined lattice position around the voxel of interest.

BRIEF DESCRIPTION OF THE DRAWINGS

Exemplary embodiment(s) of the present invention will be described in detail based on the following figures, wherein.

DETAILED DESCRIPTION

First Exemplary Embodiment

Hereinafter, an encoding device according to a first exemplary embodiment will be described with reference to FIG. 1.

Figure 1:
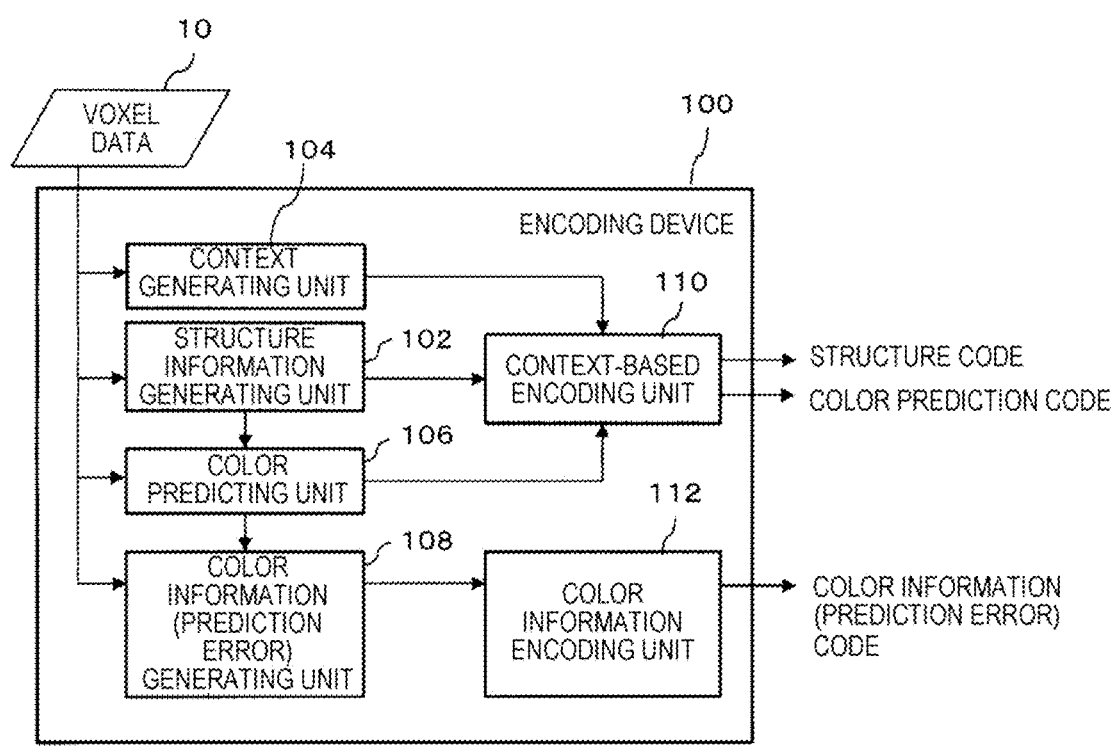
FIG. 1 is a view illustrating the functional configuration of an encoding device according to a first exemplary embodiment.

Referring to FIG. 1, an encoding device 100 includes a structure information generating unit 102, a context generating unit 104, a color predicting unit 106, a color information generating unit 108, a context-based encoding unit 110 and a color information encoding unit 112.

Voxel data 10 is input to this device. The voxel data 10 is data that defines, for example, a three-dimensional shape to be manufactured in a three-dimensional manufacturing apparatus by a group of voxels. A voxel is an element serving as a constituent unit of a three-dimensional shape. The voxel is accommodated in an individual dice-shaped small space obtained by dividing a three-dimensional space containing the three-dimensional shape into lattices with equally-spaced straight lines parallel to x, y and z coordinate axes. This small space is hereinafter called a lattice position or a cell. The small space is of a cubic shape and the voxel is typically, but is not limited to, a cube-shaped element that occupies the entire small space. Individual voxels have at least one attribute such as a color, a material, a strength of a relationship with adjacent voxels (representing a strength of bond, for example). The lattice positions in the space include a lattice position where there is a voxel constituting a three-dimensional shape and a lattice position where there is no such voxel. The voxel data 10 includes information indicating the presence/absence of a voxel at each individual lattice position and information indicating a value of at least one attribute of a voxel with respect to a lattice position having the voxel. The FAV format is an example of a data format capable of expressing such voxel data 10 ("The Next-Generation 3D Printing Data Format FAV, Which Enables an Unprecedented Wide Range of Expression," Tomonari Takahasi and Masahiko Fujii, Fuji Xerox Technical Report, No. 26, Apr. 27, 2017).

The structure information generating unit 102 extracts structure information indicating the presence/absence of a voxel in each lattice position (cell) in three-dimensional space from the input voxel data 10. The structure information is data in which values indicating presence/absence of voxels at lattice positions (which can be expressed by one bit per lattice position) are arranged according to a predetermined arrangement order of lattice positions. When the voxel data 10 is in the FAV format, since the voxel data 10 includes data named "voxel_map" indicating the presence/absence of a voxel at each lattice position, the structure information generating unit 102 may extract the "voxel_map" from the voxel data 10.

The context generating unit 104 generates context information to be used for encoding by the context-based encoding unit 110. The context information is a set of presence/absence of a voxel(s) at at least one predetermined lattice position three-dimensionally surrounding a lattice position of interest (in some cases, this lattice position has no voxel but it is called a "voxel of interest" for the sake of convenience).

Figure 2:
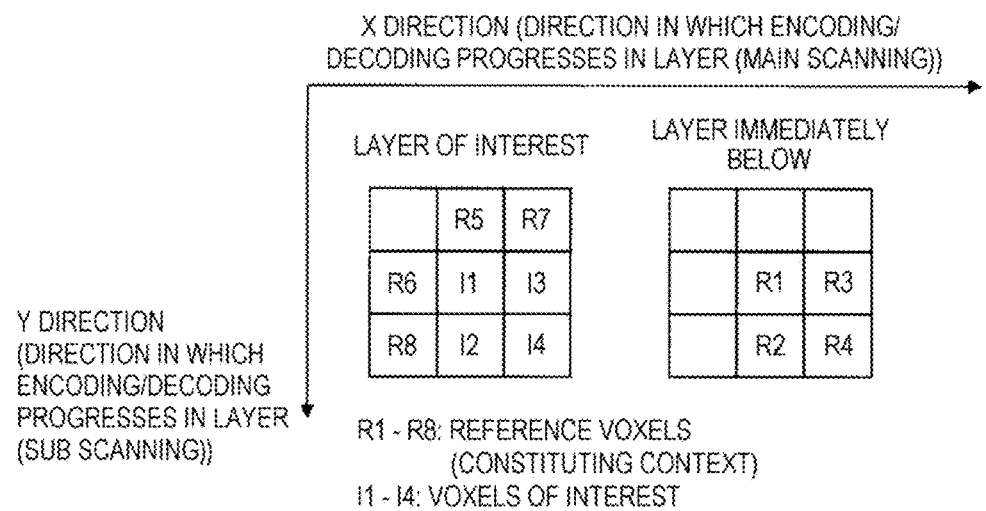
FIG. 2 is a view illustrating an example of a structure element including plural lattice positions and a lattice position group constituting context information corresponding thereto.

For example, in the example illustrated in FIG. 2, it is assumed that four voxels adjacent to each other in a 2×2 matrix in a layer of interest of the voxel data 10 are voxels of interest, that a combination of presence/absence of voxels at eight reference lattice positions (referred to as "reference voxels" for the sake of convenience) is context information, and that the eight reference voxels include four reference voxels adjacent to the voxel-of-interest group in the layer of interest and four reference voxels immediately below the four voxels of interest. In this case, in the same layer (that is, a layer formed by a lattice position group having the same z coordinate), encoding (and decoding) is advanced by zigzag scanning in which the x direction is the main scanning direction within the layer and the y direction is the sub scanning direction, and when encoding (decoding) of one layer is completed, the process proceeds to encoding (and decoding) of the next layer in the z direction. A layer currently being encoded (or decoded) is a layer of interest, and a set of lattice positions currently being encoded (or decoded) in the layer of interest is a structure element of interest (i.e., the illustrated set of four voxels of interest). In one example, the reference voxels in the layer of interest are lattice positions adjacent to the structure element of interest and on the preceding side of the structure element of interest in the main scanning direction and the sub scanning direction (that is, values of the reference voxels are already known at the time of encoding or decoding). In addition, an immediately lower layer is a layer immediately before the layer of interest along the progressing direction of encoding when the z direction in which encoding or decoding proceeds advances upward.

In this example, the illustrated set of four adjacent voxels of interest are regarded as one structure element, and the structure information is encoded on a structure element basis. That is, in the encoding of the structure information in a layer of interest, codes are determined every 4 (2×2) voxels. For example, the order as illustrated is defined for four voxels of interest in the structure element. The structure information on a certain structure element is a value obtained by arranging values (for example, expressed by one bit value representing 0 and 1) indicating the presence/absence of voxels at the lattice positions of the voxels of interest included in the structure element in the defined order. Similarly, the order as illustrated is defined for reference voxels. The context information is a value obtained by arranging values indicating the presence/absence of voxels at the lattice positions of the reference voxels in the defined order.

The color predicting unit 106 predicts the color of a voxel of interest in the voxel data 10 from the color of a voxel adjacent to the voxel of interest. The color predicting unit 106 includes plural predictors (not shown) which use different methods to obtain prediction values of the color of the voxel of interest. The "different methods" mentioned here includes a case where one or plural adjacent voxels used for prediction by the predictors are different and a case where different prediction expressions are used to predict the color of a voxel of interest from the color of one or plural adjacent voxels. If there is a prediction value matching the color of the voxel of interest among the prediction values obtained by the plural predictors, the color predicting unit 106 outputs information specifying a predictor which obtained the matched prediction value to a processing unit at the subsequent stage (for example, the context-based encoding unit 110). In a case where the plural predictors are ranked and there are plural predictors that make a prediction matching with the color of a voxel of interest, information specifying the highest-ranked predictor is output to the subsequent stage. When none of the plural predictors obtains a prediction value matching the color of the voxel of interest, the color predicting unit 106 outputs a predetermined value indicating a "misprediction" to the subsequent processing unit. The ranking of the predictors may be changed dynamically, for example, by raising the ranking of a predictor with high frequency of successful prediction in the course of encoding voxel data.

Figure 3:
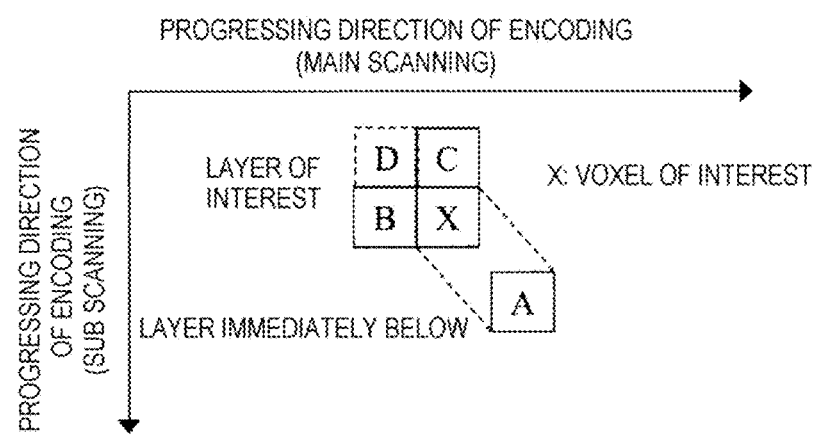
FIG. 3 is a view illustrating an adjacent voxel group used for color prediction of a voxel of interest.

In the example illustrated in FIG. 3, it is assumed that a lattice position immediately below a voxel of interest X in the layer of interest is A and lattice positions immediately before the voxel of interest X in the layer of interest in the main scanning direction and the sub scanning direction are B and C, respectively. For example, the color predicting unit 106 includes a first predictor that outputs the color of a voxel at the lattice position A as a prediction value of the color of the voxel of interest X (hereinafter simply referred to as a "prediction value"), a second predictor that outputs the color of the lattice position B as a prediction value, and a third predictor that outputs the color of the lattice position C as a prediction value. These first to third predictors are merely examples. Instead of these, predictors that refer to colors at plural lattice positions for prediction may be used. Examples of such predictors include a predictor that outputs an average of the colors at the lattice positions A and B as a prediction value, a predictor that outputs an average of the colors at the lattice positions A and C as a prediction value, and a predictor that outputs an average of the colors at lattice positions B and C as a prediction value. Further, as the adjacent lattice positions of the voxel of interest to be referred to for prediction, not only lattice positions (cubic cells) adjacent to the surface of the voxel of interest illustrated in FIG. 3 but also lattice positions adjacent to sides of the voxel of interest (in the example of FIG. 3, a lattice position D indicated by a broken line) or lattice position adjacent to vertices of the cube of the voxel of interest (in the example of FIG. 3, a lattice position immediately below the lattice position D) may be used.

When there is no voxel at a lattice position to be referred to, the predictors predict a predetermined color (for example, white or black) as the color of the lattice position.

When all of the plural predictors in the color predicting unit 106 mispredict (that is, when none of the plural predictors obtains a color matching the color of the voxel of interest), the color information generating unit 108 calculates color information indicating a difference (that is, a prediction error) between the color of a predetermined reference lattice position (for example, the lattice position A in the example of FIG. 3) and the color of the voxel of interest.

The context-based encoding unit 110 uses the context information generated by the context generating unit 104 to encode the structure information generated by the structure information generating unit 102 and the prediction result (that is, a value indicating a predictor which successfully predicts or misprediction) obtained by the color predicting unit 106. The encoding process performed by the context-based encoding unit 110 will be described in more detail later by way of an example.

The color information encoding unit 112 encodes the color information generated by the color information generating unit 108 to generate a color information code. An encoding method used for this encoding is not particularly limited, but this encoding may be implemented with any one of methods of related art and methods to be developed in the future.

Figure 4:
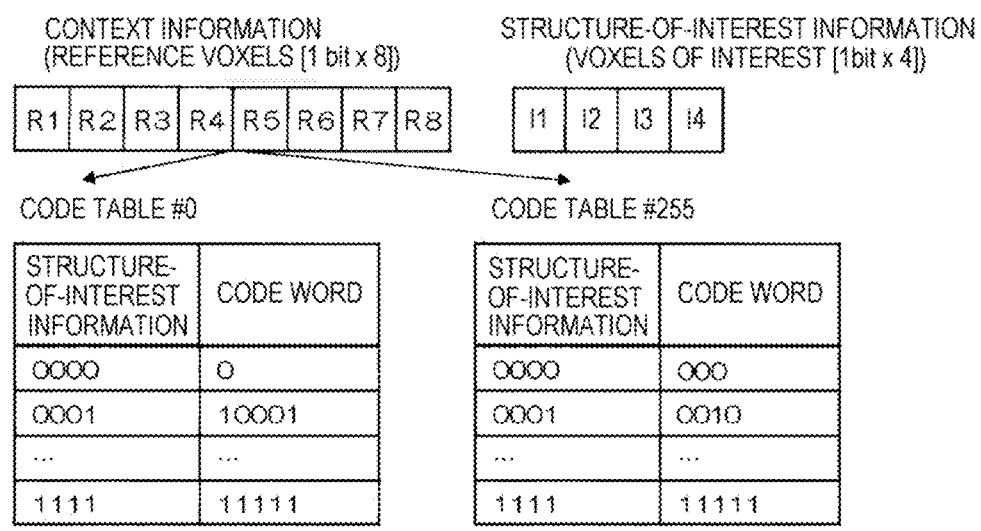
FIG. 4 is a view for explaining the mechanism of encoding of a structure element.

Next, an example of a process of encoding the structure information performed by the context-based encoding unit 110 will be described with reference to FIG. 4. This example uses the voxels of interest and the reference voxels illustrated in FIG. 2.

In this example, the context-based encoding unit 110 has a code table corresponding to each of values of the context information. In the example of FIG. 2, the context information is an 8-bit value indicating the presence/absence of voxels at the positions (lattice positions) of the eight reference voxels. Thus, $2^8$ (i.e., 256) code tables (code tables #0 to #255 illustrated) are prepared. Code words corresponding to values of the structure information of a structure element of interest which is an object to be encoded (indicated as "structure-of-interest information" in the figure) are registered in each code table. In the example of FIG. 2, the structure element of interest includes four voxels of interest, and the structure-of-interest information is a 4-bit value indicating the presence/absence of voxels at the positions of these four voxels of interest. The code table for each context information may be generated premised on that the voxel data 10 to be encoded is scanned once, the appearance frequencies of combinations of the structure information of the structure elements in the voxel data 10 and the context information are obtained, and an optimization for the voxel data is performed based on the information of the appearance frequencies. In addition, a set of code tables for context information obtained from examples of numerous voxel data in the past may be registered in the context-based encoding unit 110 and used for encoding.

The context-based encoding unit 110 reads a value of the structure element of interest (structure-of-interest information) from the structure information generated by the structure information generating unit 102, and acquires the context information corresponding to the structure element of interest from the context generating unit 104. Then, the context-based encoding unit 110 outputs a code word corresponding to the structure-of-interest information in the code table corresponding to the context information, as a structure code which is the encoding result of the structure-of-interest information.

Figure 5:
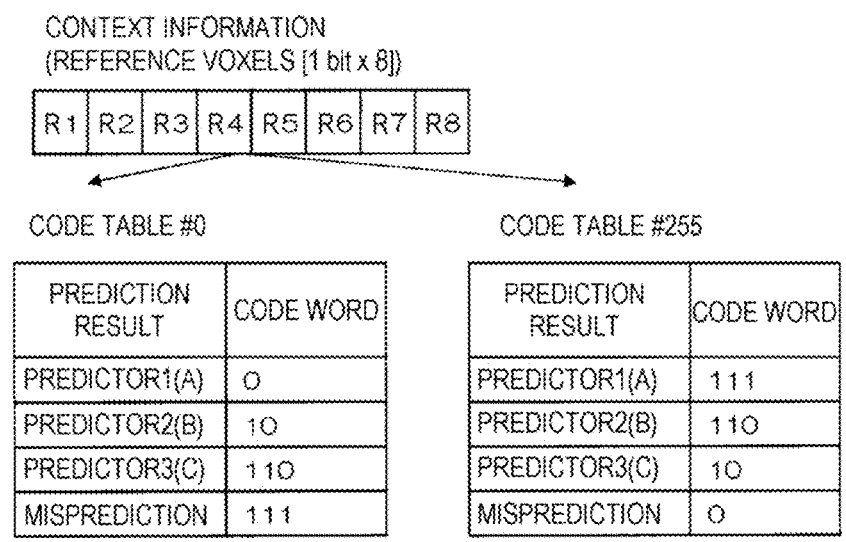
FIG. 5 is a view for explaining the mechanism of encoding of a color prediction result.

Next, an example of a process of encoding the prediction result of the color predicting unit 106, which is performed by the context-based encoding unit 110, will be described with reference to FIG. 5. In this example, the context information including a reference voxel group corresponding to the structure element of interest illustrated in FIG. 2 is used. In addition, in this example, it is assumed that the color predicting unit 106 has three predictors 1 to 3 that output the colors of the reference lattice positions A, B and C illustrated in FIG. 3 as prediction values of the voxel of interest X. It is also assumed that if there is a predictor that correctly predicts the color of the voxel of interest X among the predictors 1 to 3, identification information of the predictor is output as a prediction result and that if there is no such a predictor, a predetermined value indicating a misprediction is output as a prediction result. For predictor ranking, for example, the predictor 1 (A) is ranked highest, the predictor 2 (B) is ranked next, and the predictor 3 (C) is ranked lowest.

In this example, the context-based encoding unit 110 has a total of 256 code tables #0 to #255 corresponding to the values of the context information illustrated in FIG. 2. A code word corresponding to each value of the prediction result of the color predicting unit 106 is registered in each code table. For example, in the case of using the code table #0, if the prediction result of the color predicting unit 106 is the "predictor 1", the prediction result is converted into a value "0" of one bit which is a corresponding code word. The code table for each context information may be generated premised on that the voxel data 10 to be encoded is scanned once, the appearance frequencies of combinations of color prediction results of the respective voxels in the voxel data 10 and the context information are obtained, and an optimization for the voxel data is performed based on the information of the appearance frequencies. In addition, a set of code tables for context information obtained from examples of numerous voxel data in the past may be registered in the context-based encoding unit 110 and used for encoding.

In the process of encoding the color prediction result, the context-based encoding unit 110 acquires the context information corresponding to the structure element to which the voxel of interest belongs from the context generating unit 104. Then, from a code table corresponding to the context information, a code word corresponding to the prediction result of the color of the voxel of interest is output as a color prediction code of the voxel of interest.

When the structure information and the encoding of the color prediction result are taken together, the process performed by the context-based encoding unit 110 is as follows.

First, each time the structure information of the structure element of interest having 4 voxels (structure-of-interest information) is extracted from the structure information generated by the structure information generating unit 102, the context-based encoding unit 110 acquires the context information indicated by a reference voxel group corresponding to the structure element of interest from the context generating unit 104. The context-based encoding unit 110 uses a code table for the structure information corresponding to the context information to encode the structure-of-interest information. In parallel with this, the context-based encoding unit 110 acquires the prediction result of each voxel of interest included in the structure element of interest from the color predicting unit 106, and encodes the prediction result of each voxel of interest using a code table for the color prediction result corresponding to the context information. Therefore, in this example, the context-based encoding unit 110 outputs four color prediction codes in association with one structure code. The four color prediction codes are output according to the order of the voxels of interest illustrated in FIG. 2.

In conjunction with this process, the color information generating unit 108 generates color information indicating a prediction error of the color of a voxel for which the color predicting unit 106 outputs a prediction value "misprediction". Then, the color information encoding unit 112 encodes this color information to generate a color information code.

Therefore, the context-based encoding unit 110 outputs four color prediction codes while outputting one structure code. If there are one or more "misprediction" among these four color prediction codes, the context-based encoding unit 110 outputs color information code for each voxel corresponding to the "misprediction". Assuming that a combining unit that combines the outputs of the context-based encoding unit 110 and the color information encoding unit 112 on a structure element basis is installed at the subsequent stage of the context-based encoding unit 110 and the color information encoding unit 112, the contents of the output data of the combining unit are as follows.

[Structure 1] [Color Prediction 11 (successful)] [Color Prediction 12 (successful)] [Color Prediction 13 (misprediction)] [Color Information 13] [Color Prediction 14 (misprediction)] [Color Information 14] [Structure 2] [Color Prediction 21 (successful)] [Color Prediction 22 (successful)] [Color Prediction 23 (successful)] [Color Prediction 14 (successful)] [Structure 3] . . . .

In the notation of this output data, [structure 1] and the like indicate a structure code, [Color Prediction 11 (successful)] and the like indicate a color prediction code, and [Color Information 13] and the like indicate a color information code.

In a case where the combining unit is not installed, the structure code, the color prediction code and the color information code are output in parallel from the context-based encoding unit 110 and the color information encoding unit 112. Even in this case, for example, at the time of decoding, the structure code, the color prediction code and the color information code may be associated with each other based on the arrangement order of structure codes (that is, the output order), the arrangement order of color prediction codes and the arrangement order of color information codes.

Output data of the context-based encoding unit 110 and the color information encoding unit 112 or data obtained by combining the output data on a structure element basis in the combining unit are delivered as a stream or as a file, to the decoding side. When a set of code tables optimized for the voxel data 10 to be encoded (for structure information and for color prediction result) is generated, such a set is also delivered to the decoding side.

Figure 6:
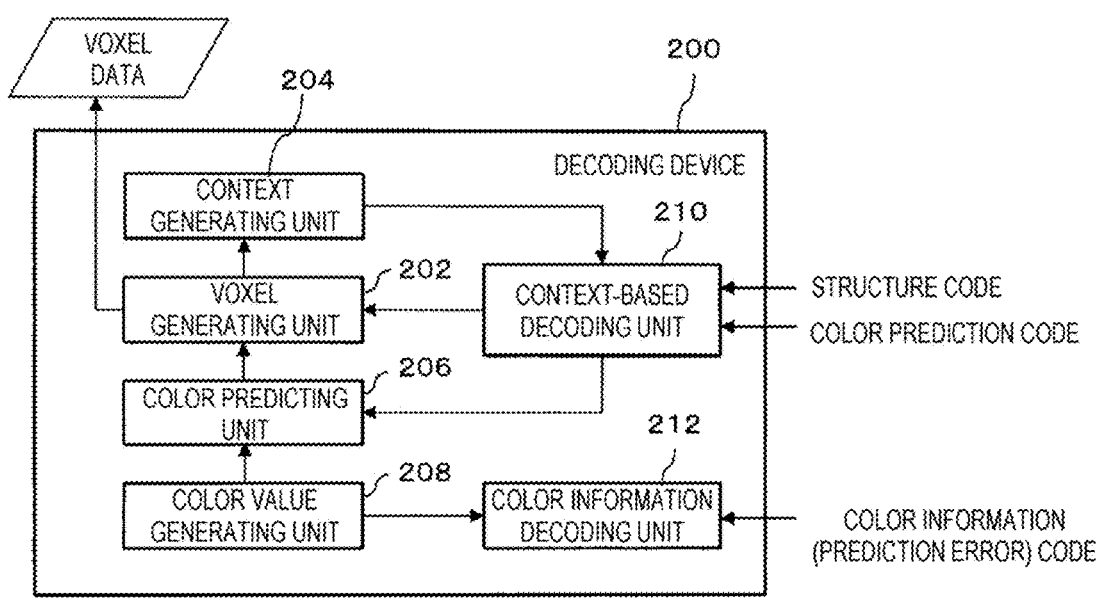
FIG. 6 is a view illustrating a functional configuration of a decoding device.

Schematically speaking, the encoding result (a set of the structure code, the color prediction code and the color information code) obtained by the encoding device 100 may be decoded by performing the encoding procedure described above in an inverse manner. An example of a decoding device 200 that executes this decoding process will be described with reference to FIG. 6.

The decoding device 200 includes a voxel generating unit 202, a context generating unit 204, a color predicting unit 206, a color value generating unit 208, a context-based decoding unit 210 and a color information decoding unit 212.

The color information decoding unit 212 receives a color information code in the encoding result data and converts the color information code into color information (prediction error) by the inverse process of the encoding of the color information.

The color value generating unit 208 adds the color information (prediction error) decoded by the color information decoding unit 212 to a color value of a predetermined reference lattice position already decoded, to generate a color value of a voxel corresponding to the color information.

The context-based decoding unit 210 decodes the structure code and the color prediction code in the encoding result data into the structure information and the color prediction result, respectively. In this decoding, the context generating unit 204 obtains the context information from the already obtained decoding result (presence/absence of a voxel and a color value) of a lattice position, and reads information indicated by a code to be decoded, from a code table corresponding to the context information. That is, when decoding a certain structure code, the context-based decoding unit 210 specifies a code table (see FIG. 2) corresponding to the context information on the structure element corresponding to the structure code from the code tables for the structure code, reads a value of structure-of-interest information corresponding to the structure code from the code table, and outputs it as a decoding result to the voxel generating unit 202. Further, when decoding a color prediction code of each voxel belonging to the structure element, the context-based decoding unit 210 specifies a code table (see FIG. 3) for color prediction information corresponding to the context information, reads a prediction result corresponding to the color prediction code from the code table, and outputs it as a decoding result to the color predicting unit 206.

The color predicting unit 206 has the same plural predictors as the color predicting unit 106 of the encoding device 100. Like the predictors in the color predicting unit 106, each of these predictors predicts a color of a voxel of interest from the colors of voxels adjacent to the voxel of interest. The colors of adjacent voxels to be referenced for prediction are already decoded. The color predicting unit 206 selects a prediction value of a predictor indicated by the color prediction result decoded from the color prediction code by the context-based decoding unit 210 among the plural predictors, and outputs the prediction value to the voxel generating unit 202. When the value of the color prediction result is other than "misprediction", the prediction value indicates a color value. When the value of the color prediction result is "misprediction", there is no corresponding predictor. In this case, the color predicting unit 206 acquires the color value generated from the color information by the color value generating unit 208, and outputs the color value to the voxel generating unit 202.

The voxel generating unit 202 uses the structure information input from the context-based decoding unit 210 to generate a voxel. That is, in the structure information, a voxel is generated at a lattice position of "presence of voxel" and a voxel is not generated at a lattice position of "absence of voxel". In addition, the voxel generating unit 202 correlates the generated voxel with the color value input from the color predicting unit 206. As a result, a voxel group having a color value is restored.

The context generating unit 204 generates the context information from the voxel group restored by the above process. The generated context information is used for the decoding process by the context-based decoding unit 210.

The encoding device 100 and the decoding device 200 according to the first exemplary embodiment have been described above. In the first exemplary embodiment, since not only the structure information but also the color information are encoded using the context information, it is expected that the encoding efficiency (compression ratio) can be further improved as compared with encoding only the structure information on a context basis. In voxel data for three-dimensional manufacturing, the presence/absence of a voxel at each lattice position (that is, whether the lattice position is a part of the three-dimensional object to be manufactured or is outside the three-dimensional object) is affected by the presence/absence of voxels at the surrounding lattice positions. This is because the three-dimensional object is manufactured by continuously accumulating materials. Likewise, the color of a voxel in a lattice position is also affected by the presence/absence of voxels at the surrounding lattice positions. For example, as for the color of a three-dimensional shape generated by three-dimensional manufacturing, in many cases, it is sufficient to color only voxels in the neighborhood of the surface of a three-dimensional shape and it is unnecessary to color voxels at a deep position inside the three-dimensional shape. Therefore, the color of a voxel is affected not only by the tendency of the colors of voxels around that voxel but also by the presence/absence of voxels at the surrounding lattice positions. Thus, by using the context information for color encoding, the encoding efficiency is expected to be higher than that in a case where no context information is used.

Further, in the first exemplary embodiment, since the structure information is encoded on the basis of a structure element including plural voxels, the encoding efficiency is further improved as compared with a case where the structure information is encoded on the basis of a voxel.

The first exemplary embodiment described above is merely an example, and various modifications and improvements may be made.

For example, when a voxel has attributes other than the color, similarly to the color, encoding using the context information can be also applied to the attributes other than the color. The attributes other than the color possessed by the voxel may include, for example, material information, link information indicating the strength of the relationship with surrounding voxels, and the like. The material information is identification information indicating the type of a material used for manufacturing the relevant voxel. The link information is, for example, a numerical value configured by arranging values indicating the strength of the relationship between the relevant voxel and the adjacent voxels in the predetermined arrangement order of the adjacent voxels. Here, as a range of the adjacent voxels to be included in the link information, any of 6-neighborhood (the adjacent voxels are in surface contact with the relevant voxel), 18-neighborhood (the adjacent voxels are in side contact with the relevant voxel), and 26-neighborhood (the adjacent voxels are in vertex contact with the relevant voxel) may be used. In the case of using 6-neighborhood, assuming that the arrangement order of the adjacent voxels is defined in the order of, for example, upper, lower, right, left, front and back of the relevant voxel, one numerical value obtained by arranging and merging the strength value of the relationship between the relevant voxel and the upper adjacent voxel, the strength value of the relationship between the relevant voxel and the lower adjacent voxel, . . . , the strength value of the relationship between the relevant voxel and the back adjacent voxel in this order is the link information of the relevant voxel. The strength of the relationship with each adjacent voxel indicated by the link information can be used as, for example, information indicating the bonding strength between the relevant voxel and its adjacent voxels. Instead of or in addition to parts for color encoding (that is, parts responsible for the encoding process of the color prediction results in the color predicting unit 106, the color information generating unit 108, the color information encoding unit 112 and the context-based encoding unit 110), the encoding device 100 may have a mechanism that performs the same encoding process on other attributes such as material or link strength.

In the first exemplary embodiment, as context information to be used to encode the color (or other attributes) of a voxel, the context information (see FIG. 2) used to encode the structure information of the structure element (4 (2×2) adjacent voxels in the layer of interest in the example of FIG. 2) to which the voxel belongs is used, but this is merely an example. The context information used to encode the color or other attributes of the voxel may be generated and used separately from the context information for encoding of the structure information. The context information in this case may be, for example, the presence/absence of voxels at predetermined lattice positions around a voxel to be coded for the attributes arranged in a predetermined order.

In the case where the context information is independently generated in the encoding of the structure information and the encoding of the attribute information, plural mechanisms for generating the context information are required, but, in the first exemplary embodiment, only one mechanism that generates the context information is enough.

The way of taking the structure element (2×2 voxels) illustrated in FIG. 2 or an adjacent voxel group (the illustrated eight voxels) constituting the context information is merely an example. A structure element including more or fewer voxels may be used. Further, the number of adjacent voxels of the structure element used for the context information may be increased or decreased.

Further, for a lattice position having no voxel in the structure element of interest, the context-based encoding unit 110 may not output a color prediction code. Likewise, the color information encoding unit 112 may be notified of a lattice position having no voxel in the structure element of interest from the context-based encoding unit 110 and may not output the color information code for the notified lattice position. By doing this, the encoding efficiency (compression ratio) is further improved. Even in the case of such code reduction, since the decoding device 200 can know which color prediction code or color information code corresponding to a certain lattice position in the structure element of interest is deleted from the decoding result of the structure code, there is no problem in advancing the decoding.

Second Exemplary Embodiment

An encoding device according to a second exemplary embodiment will be described with reference to FIG. 7.

Figure 7:
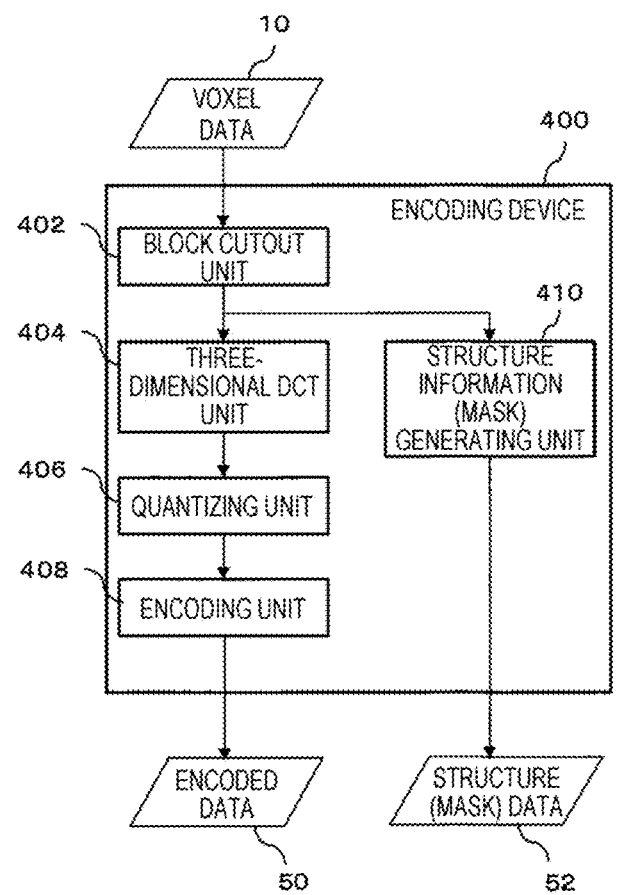
FIG. 7 is a view illustrating the configuration of an encoding device according to a second exemplary embodiment.

Referring to FIG. 7, an encoding device 400 includes a block cutout unit 402, a three-dimensional DCT unit 404, a quantizing unit 406, an encoding unit 408 and a structure information generating unit 410.

Voxel data 10 is input to this device.

Figure 8:
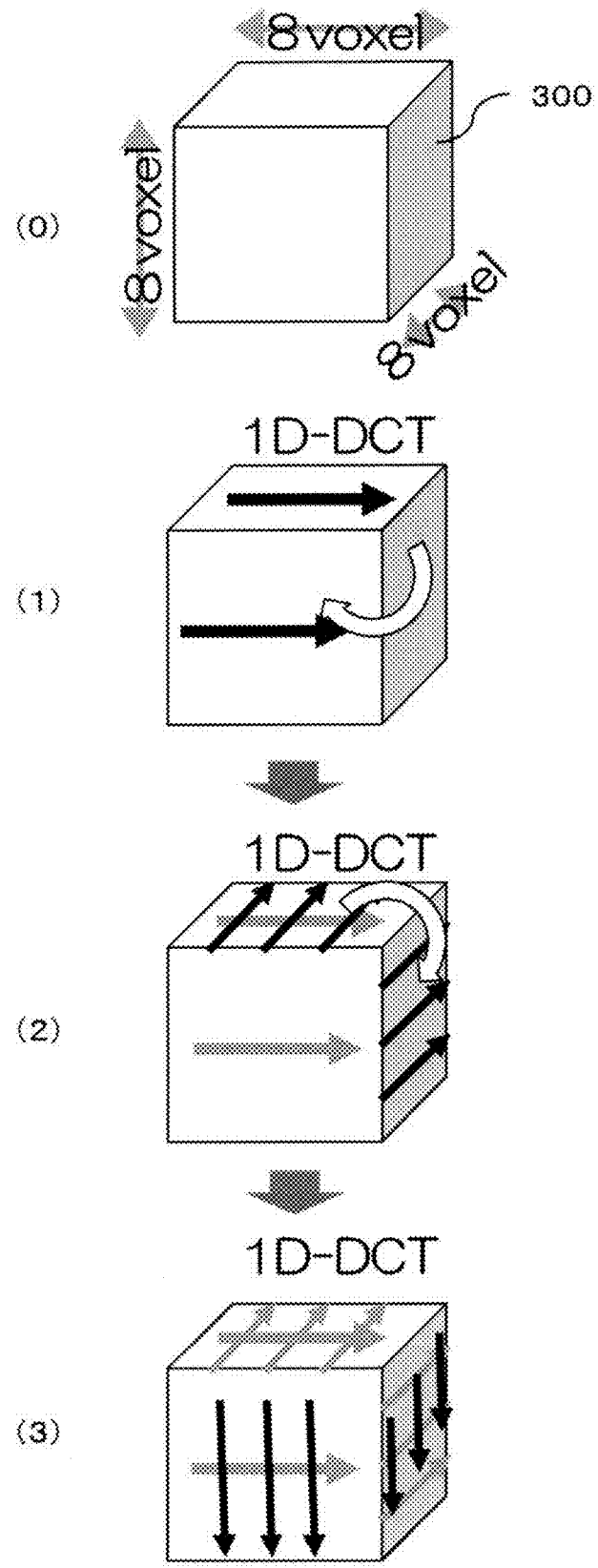
FIG. 8 is a view for explaining a process by a three-dimensional DCT unit.

The block cutout unit 402 cuts out a block from the voxel data 10. In the example illustrated in (0) of FIG. 8, a block 300 is, for example, a chunk having the predetermined number of voxels (for example, eight voxels) in the longitudinal, lateral and depth directions.

The three-dimensional DCT unit 404 performs three-dimensional discrete cosine transform (DCT) on the block cut-out by the block cutout unit 402.

Figure 9:
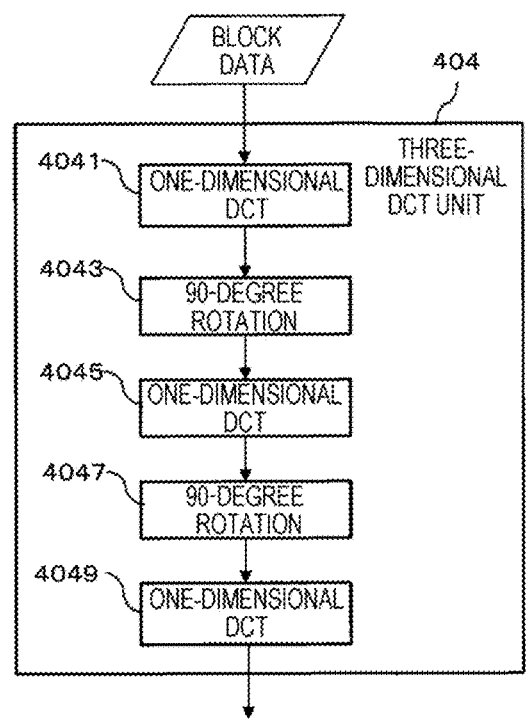
FIG. 9 is a view illustrating the internal configuration of the three-dimensional DCT unit.

In one example, the three-dimensional DCT unit 404 performs a process illustrated in FIG. 9. That is, first, as illustrated in (1) of FIG. 8, the three-dimensional DCT unit 404 executes one-dimensional DCT 4041 on the block 300 along a predetermined direction, for example, the x direction. That is, in this case, the DCT is performed on attribute values (for example, color values) of voxels arranged in the X direction within every column having the same y coordinate within a layer having the constant z coordinate. This process is executed for different layers having different z coordinate. There is a lattice position having no voxel in a column. Such a lattice position is subjected to one-dimensional DCT after being filled (padded) with, for example, a predetermined attribute value (for example, 0), an attribute value of an adjacent voxel, or an average of attribute values of a surrounding voxel group (for example, a voxel group belonging to a block including the lattice position). The processing result of one-dimensional DCT for a certain column is overwritten on the value of each voxel in that column. Next, the three-dimensional DCT unit 404 performs a process of 90-degree rotation 4043 about a certain coordinate axis (for example, the z axis) for the block which is the processing result of the one-dimensional DCT 4041. Next, as illustrated in (2) of FIG. 8, the three-dimensional DCT unit 404 executes one-dimensional DCT 4045 in the same direction as before for the rotated block. Since the block has rotated by 90 degrees, the one-dimensional DCT 4045 is a DCT in the coordinate axis direction different from the earlier one-dimensional DCT 4041. Next, the three-dimensional DCT unit 404 applies 90-degree rotation 4047 to the block of the processing result of the one-dimensional DCT 4045 with a coordinate axis different from the earlier 90-degree rotation 4043 as a rotation axis. Then, as illustrated in (3) of FIG. 8, the three-dimensional DCT unit 404 executes one-dimensional DCT 1049 on the rotated block in the same direction as before. The one-dimensional DCT 4049 is a DCT in the direction of the coordinate axis different from the one-dimensional DCT 4041 and the one-dimensional DCT 4045. Through the above processing, the three-dimensional DCT is performed on the block.

Referring back to FIG. 7, the quantizing unit 406 performs a known quantization process on the data of the three-dimensional DCT result of each block output from the three-dimensional DCT unit 404. Although the amount of data is reduced accordingly, since the process of the encoding device 400 is an lossy compression process accompanied by quantization, even when the encoded data of the compression result is decoded, the encoded data cannot return to the same data as the original voxel data. Even in the case of voxel data, like JPEG compression of an image, when the encoded data obtained by such compression is decoded, noise such as mosquito noise occurs.

The encoding unit 408 performs an encoding process of related art such as entropy encoding on data of the quantization result obtained by the quantizing unit 406 to generate encoded data (compressed data) 50 for the voxel data 10.

The structure information generating unit 410 generates structure information 52 indicating the presence/absence of a voxel in each lattice position (cell) of the block cut out by the block cutout unit 402. The structure information is data in which values indicating presence/absence of voxels at lattice positions (which can be expressed by one bit per lattice position) are arranged according to a predetermined arrangement order of lattice positions. When the voxel data 10 is in FAV format, since the voxel data 10 includes data named "voxel_map" indicating the presence/absence of a voxel at each lattice position, the structure information generating unit 410 may extract the "voxel_map" from the voxel data 10 and may extract information of each cell in the relevant block from this "voxel_map" to generate the structure information 52.

The encoded data 50 generated by the encoding unit 408 and the structure information 52 generated by the structure information generating unit 410 are output in a state in which they are associated with each other.

Figure 10:
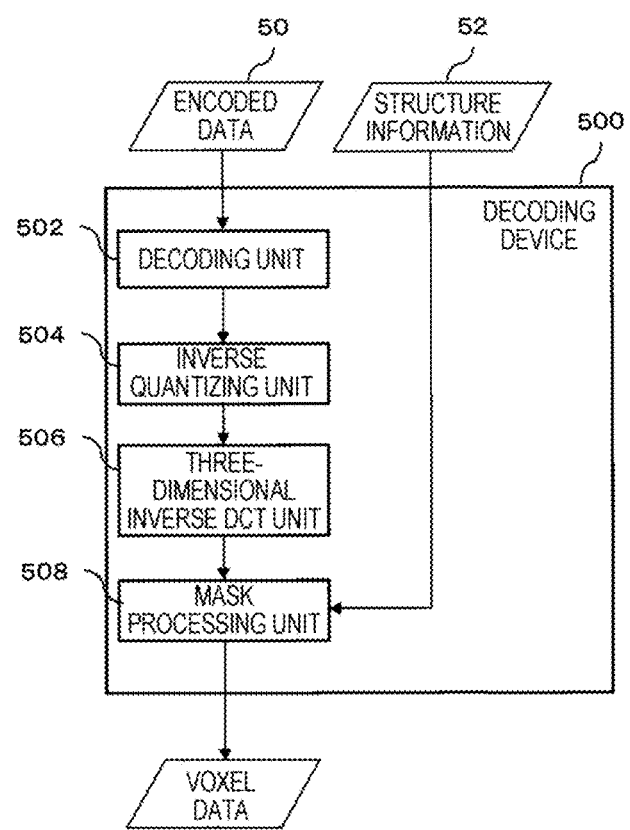
FIG. 10 is a view illustrating the configuration of a decoding device according to the second exemplary embodiment.

Next, an example of a decoding device 500 for decoding the encoded data 50 will be described with reference to FIG. 10.

The decoding device 500 includes a decoding unit 502, an inverse quantizing unit 504, a three-dimensional inverse DCT unit 506 and a mask processing unit 508. The encoded data 50 and the corresponding structure information 52 are input to the decoding device 500. The decoding device 500 decodes (expands) the compressed encoded data 50.

The decoding unit 502 decodes the input encoded data 50 by a decoding process corresponding to the encoding process of the encoding unit 408. The inverse quantizing unit 504 inversely quantizes the decoding result of the decoding unit 502. The three-dimensional inverse DCT unit 506 performs an inverse DCT process on the data of the inverse quantization result. As a result, the information of the frequency space returns to an attribute value of the real space.

Since the voxel data thus restored includes noise due to quantization, there is a case where attribute values appear at lattice positions with no voxel (and hence no attribute value). In a case of voxel data for manufacturing purposes, if an attribute value appears at a lattice position where a voxel is not originally present, the lattice position will be manufactured, which will result in a shape different from the original one. For the purpose of preventing such a situation, the decoding device 500 includes the mask processing unit 508.

The mask processing unit 508 refers to the structure information 52 corresponding to the encoded data 50 to mask a value of a lattice position having no voxel (that is, change the value to a value indicating that there is no voxel) in the original voxel data 10 among the attribute values of the decoding results at the respective lattice positions (that is, the output of the three-dimensional inverse DCT unit 506). Since the voxel data output from the mask processing unit 508 undergoes lossy compression, the attribute value of each voxel may not be exactly the same as the original voxel data 10 in some cases, but the three-dimensional shape of the voxel is the same as that of the original voxel data 10.

Figure 11:
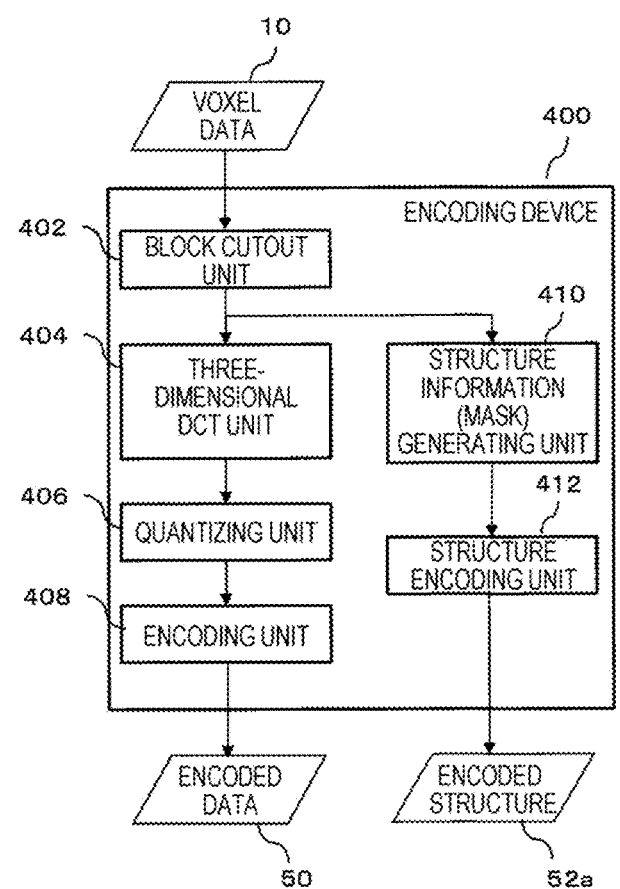
FIG. 11 is a view illustrating the configuration of an encoding device according to a modification of the second exemplary embodiment.

Next, a modification of the second exemplary embodiment will be described with reference to FIG. 11.

In the second exemplary embodiment, the structure information 52 is raw data. In the meantime, an encoding device 400 according to this modification includes a structure encoding unit 412 that compresses and encodes the structure information 52 generated by the structure information generating unit 410. The structure encoding unit 412 performs context-based compression and encoding on the structure information 52. In FIG. 11, the structure information generating unit 410 generates the structure information from the block generated by the block cutout unit 402. Instead, the structure information generating unit 410 may generate the structure information from the voxel data 10 input to the block cutout unit 402. This is also applicable to the case of the device configuration illustrated in FIG. 7.

For this compression and encoding, the structure encoding unit 412 generates context information from the voxel data 10 and compresses the structure information based on the context information.

Like the context-based encoding unit 110 of the first exemplary embodiment, the structure encoding unit 412 performs an encoding process on the structure information. Through this encoding process, the structure information is converted into encoded structure information 52a.

The decoding device 500 corresponding to the encoding device 400 of this modification may decode the structure information from the encoded structure information 52a and supply the structure information to the mask processing unit 508. In this decoding, the context information is obtained from the decoding result of a lattice position already obtained (presence/absence of a voxel or a color value), and information indicated by a code to be decoded is read out from a code table corresponding to the context information. That is, when decoding a certain structure code, the decoding device 500 specifies a code table (see FIG. 2 in the first exemplary embodiment) corresponding to the context information on a structure element corresponding to the structure code among the code tables for the structure code, reads out the value of the structure-of-interest information corresponding to the structure code from the code table, and takes this as the decoding result. In this modification, since the encoding of the structure information is performed on the basis of a structure element having plural voxels, the encoding efficiency is further improved as compare with a case where the encoding of the structure information is performed on the basis of a voxel.

Next, another modification of the second exemplary embodiment will be described with reference to FIG. 12.

An encoding device 400 of this modification includes a voxel adding unit 401. The voxel adding unit 401 adds, to a lattice position adjacent to a voxel among lattice positions having no voxel in the voxel data 10 (referred to as a "lattice position X" for convenience), a voxel having an attribute value which is determined according to an attribute value of at least one voxel in the neighborhood of the lattice position X.

Here, the "neighborhood" of the lattice position X may be, for example, a lattice position adjacent to the lattice position (cell) X (for example, 6-neighborhood in surface-contact with the cell X, 18-neighborhood which is ones in side-contact with the cell X in addition to the 6-neighborhood, 26-neighborhood which are ones in point-contact with the cell X in addition to 18-neighborhood, etc.). In addition, a distance from a lattice position adjacent to the lattice position X to an adjacent lattice position (that is, a lattice position at a distance of two cells from the lattice position X) may be set as "neighborhood". Generally speaking, a lattice position (cell) group within a distance of a predetermined number of cells from the lattice position X may be set as "neighborhood". The lattice position X having no voxel and a voxel group located in the neighborhood thereof may be obtained from the structure information (indicating the presence/absence of a voxel at each lattice position) generated by the structure information generating unit 410 from the voxel data 10.

The voxel adding unit 401 obtains the attribute value of a voxel to be added to the lattice position X from the attribute value of a voxel located in the neighborhood of the lattice position X having no voxel by a predetermined calculation method. This calculation method may be, for example, a method of obtaining an average of attribute values of neighboring voxels or a method of weighting and averaging attribute values of neighboring voxels according to a distance from the lattice position X. Other calculation methods may well be used.

When the voxel adding unit 401 adds a voxel to each lattice position adjacent to the voxel among the lattice positions with no voxel, the surface of a three-dimensional shape represented by the original voxel data 10 (that is, an interface between the three-dimensional shape and a space without the three-dimensional shape) is covered with a layer of additional voxel group. The voxel adding unit 401 may cover the surface of the three-dimensional shape represented by the original voxel data 10 with an additional voxel layer having a thickness of N voxels by repeating the voxel adding process N times. The process performed by the voxel adding unit 401 may be regarded as a process of expanding the three-dimensional shape represented by the original voxel data 10. The block cutout unit 402, the three-dimensional DCT unit 404, the quantizing unit 406 and the encoding unit 408 perform the same processing as described above on the voxel data to which the voxel adding has been performed by the voxel adding unit 401.

As described above, when lossy compression including processing such as quantization is performed, strong noises such as mosquito noise and the like which do not exist in the original data appear in the decoded data. Such noises appear particularly in the neighborhood of an edge where an attribute value abruptly changes. Particularly, in the case of the voxel data 10 representing a three-dimensional shape to be manufactured, strong noise appears near the boundary between the three-dimensional shape and the outside. When an attribute value of this noise appears at a lattice position outside the three-dimensional shape, the lattice position is recognized as a voxel constituting a three-dimensional shape, but this is deleted by processing of the mask processing unit 508 using the structure information. However, noise also appears inside the three-dimensional shape near the boundary. Such strong noise may cause the attribute value of the voxel inside the three-dimensional shape to greatly change from its original value, but such a change cannot be handled by the mask processing unit 508.

Figure 12:
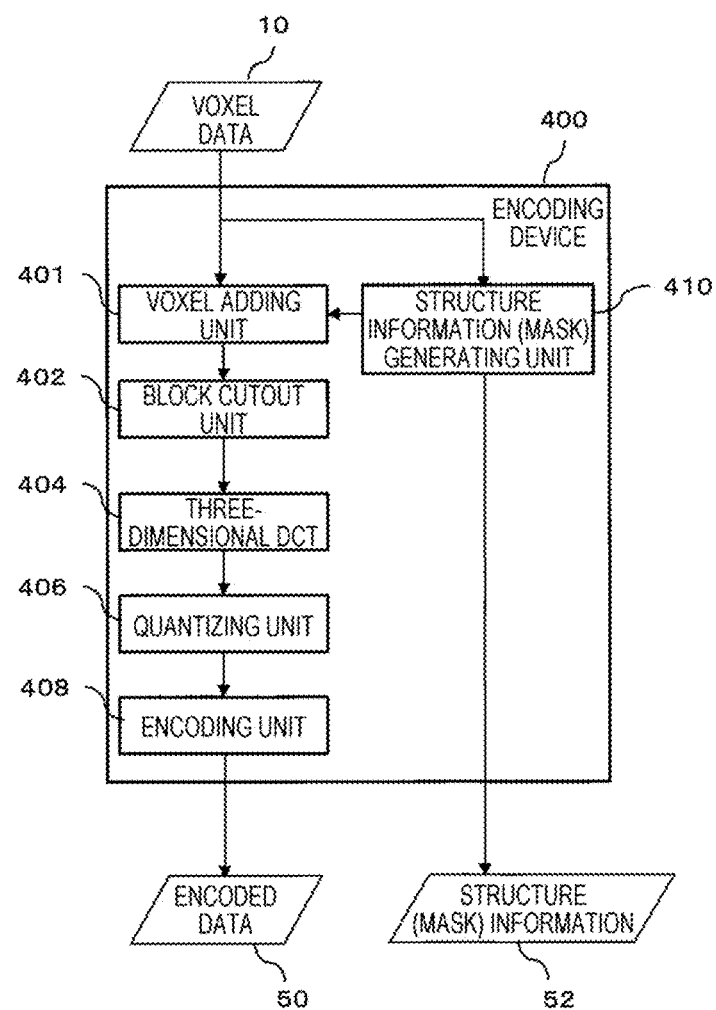
FIG. 12 is a view illustrating the configuration of an encoding device according to another modification of the second exemplary embodiment.

In contrast, since the encoding device 400 of the modification of FIG. 12 covers the surface of the three-dimensional shape represented by the original voxel data 10 with an additional voxel having an attribute value based on the attribute values of voxels near the surface of the three-dimensional shape, the boundary between the three-dimensional shape and the outside moves outward from the original three-dimensional shape. Therefore, by adding a voxel layer having a sufficient thickness to the surface of the three-dimensional shape of the voxel data 10 by means of the voxel adding unit 401, when lossy compression is applied to the data after the voxel addition, noise in the neighborhood of the surface of the three-dimensional shape represented by the decoded data is prevented or reduced from appearing inside the original three-dimensional shape.

Since the voxel thus added is deleted by the mask processing unit 508, it does not affect manufacturing.

The encoding devices 100 and 400 and the decoding devices 200 and 500 exemplified above can be configured as a hardware logic circuit in one example. As another example, the encoding devices 100 and 400 and the decoding devices 200 and 500 may be implemented, for example, by allowing a built-in computer to execute a program representing the function of each functional module in each device. Here, the computer has a circuit configuration including, as hardware, for example, a processor such as a CPU, memories (primary storage) such as a random access memory (RAM) and a read only memory (ROM), an HDD controller for controlling a hard disk drive (HDD), various types of I/O (Input/Output) interfaces, a network interface for performing control for connection with a network such as a local area network, and so on, which are connected via, for example, a bus. In addition, a disk drive for reading and/or writing for a portable disk recording medium such as a CD or a DVD, a memory reader/writer for reading and/or writing for a portable nonvolatile recording medium of various standards such as a flash memory, and the like may be connected to the bus via an I/O interface. A program in which the processing contents of the respective function modules exemplified above are described is stored in a fixed storage device such as a hard disk drive via a recording medium such as a CD or a DVD or via a communication unit such as a network, and is installed in the computer. The program stored in the fixed storage device is read into the RAM and executed by the processor such as the CPU to implement the functional module group exemplified above. In addition, the encoding devices 100 and 400 and the decoding devices 200 and 500 may be implemented by a combination of software and hardware.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An encoding device comprising:
   an extracting unit that extracts, from voxel data expressing a three-dimensional shape by a collection of voxels arranged at lattice positions in a space, (i) structure information indicating presence/absence of a voxel at each lattice position and (ii) attribute information including an attribute value of each voxel;
   a structure encoding unit that encodes the structure information by determining a structure code corresponding to the structure information on a structure element having at least lattice position according to first context information, the first context information being a value obtained by arranging values indicating presence/absence of a voxel at at least one predetermined lattice position around the structure element in a defined order; and
   an attribute encoding unit that encodes an attribute value of a voxel of interest into an attribute code using second context information, the second context information being a value obtained by arranging values indicating presence/absence of a voxel at at least one predetermined lattice position around the voxel of interest in a defined order,
   wherein the attribute encoding unit uses the first context information corresponding to the structure element including the lattice position at which the voxel of interest is present, as the second context information.

2. The encoding device according to claim 1, wherein
   a structure code table for encoding of the structure information is provided for each value of the first context information, and
   the structure encoding unit determines the structure code corresponding to the structure information on the structure element using the structure code table corresponding to the value of the first context information on the structure element.

3. The encoding device according to claim 1, wherein
   the structure encoding unit sets a set of a plurality of lattice positions adjacent to each other as the structure element, and
   the structure encoding unit encodes the structure information indicating a combination of presence/absence of voxels at the respective lattice positions included in the structure element, using the first context information indicating the presence/absence of the voxels at the plurality of predetermined lattice positions three-dimensionally around the structure element.

4. The encoding device according to claim 3, wherein for a lattice position indicated by the structure information to have no voxel, the attribute encoding unit does not output the attribute code determined by the predictive coding.

5. The encoding device according to claim 1, wherein
   an attribute code table for encoding of the attribute information is provided for each value of the second context information,
   the attribute encoding unit generates the attribute code by predictively encoding the attribute value corresponding to the voxel of interest based on attribute values of voxels around the voxel of interest, and
   the attribute encoding unit uses the attribute code table corresponding to the value of the second context information corresponding to the voxel of interest as a code table in the predictive encoding.

6. A decoding device comprising:
   an input unit that inputs the structure code and the attribute code which are generated by the encoding device according to claim 1;
   a structure decoding unit that decodes the structure code using the first context information which is a combination of presence/absence of already decoded voxels at the at least one predetermined lattice position around the structure element corresponding to the structure code;
   an attribute decoding unit that decodes the attribute code using the second context information indicating presence/absence of already decoded voxels at at least one predetermined lattice position around a voxel corresponding to the attribute code; and
   a restoring unit that restores the voxel data from the decoded structure information and the attribute values of the respective voxels.

7. A non-transitory computer readable medium storing a program causing a computer to execute a decoding process, the decoding process comprising:
   inputting the structure code and the attribute code generated by the encoding device according to claim 1;
   decoding the structure code using the first context information which is a combination of presence/absence of already decoded voxels at the at least one predetermined lattice position around the structure element corresponding to the structure code;
   decoding the attribute code using second context information indicating presence/absence of already decoded voxels at at least one predetermined lattice position around a voxel corresponding to the attribute code; and
   restoring the voxel data from the decoded structure information and the attribute values of the respective voxels.

8. A non-transitory computer readable medium storing a program causing a computer to execute an encoding process, the encoding process comprising:
   extracting, from voxel data expressing a three-dimensional shape by a collection of voxels arranged at lattice positions in a space, (i) structure information indicating presence/absence of a voxel at each lattice position and (ii) attribute information including an attribute value of each voxel;
   encoding the structure information by determining a structure code corresponding to the structure information on a structure element having at least lattice position according to first context information, the first context information being a value obtained by arranging values indicating presence/absence of a voxel at at least one predetermined lattice position around the structure element in a defined order; and
   encoding an attribute value of a voxel of interest into an attribute code using second context information, the second context information being a value obtained by arranging values indicating presence/absence of a voxel at at least one predetermined lattice position around the voxel of interest in a defined order, wherein the first context information corresponding to the structure element including the lattice position at which the voxel of interest is present is used as the second context information.

9. An encoding device comprising:
an extracting unit that extracts structure information indicating presence/absence of a voxel at each lattice position from three-dimensional data expressing a three-dimensional shape by a collection of voxels which have attribute values, respectively and which are arranged at lattice positions in a space;
a compressing unit that generates compressed data by performing lossy compression on the attribute values of the three-dimensional data at the respective lattice positions;
a structure encoding unit that encodes the structure information and determines a structure code corresponding to the structure information of a structure element of interest including at least one adjacent lattice position according to context information, the context information being a value obtained by arranging values indicating presence/absence of a voxel at at least one predetermined lattice position around the structure element of interest in a defined order, wherein
the structure encoding unit sets a set of a plurality of lattice positions adjacent to each other as the structure element of interest, and
the structure encoding unit encodes the structure information indicating a combination of presence/absence of voxels at the respective lattice positions included in the structure element of interest, using the context information indicating presence/absence of voxels at a plurality of predetermined lattice positions three-dimensionally around the structure element of interest; and
an output unit that outputs encoded structure information including the structure code determined by the structure encoding unit and the compressed data in association with each other.

10. The encoding device according to claim 9, wherein
a structure code table for encoding of the structure information is provided for each value of the context information, and
the structure encoding unit determines a structure code corresponding to the structure information of the structure element of interest, using the structure code table corresponding to the value of the context information on the structure element of interest.

11. The encoding device according to claim 10, further comprising:
an adding unit that adds, to a lattice position which are in contact with the voxel and which has no voxel, a voxel having an attribute value which is obtained from an attribute value of at least one voxel in the neighborhood of the lattice position having no voxel,
wherein the compressing unit performs the lossy compression on the three-dimensional data to which the voxel is added by the adding unit.

12. The encoding device according to claim 9, further comprising:
an adding unit that adds, to a lattice position which are in contact with the voxel and which has no voxel, a voxel having an attribute value which is obtained from an attribute value of at least one voxel in the neighborhood of the lattice position having no voxel,
wherein the compressing unit performs the lossy compression on the three-dimensional data to which the voxel is added by the adding unit.

13. The encoding device according to claim 9, further comprising:
an adding unit that adds, to a lattice position which are in contact with the voxel and which has no voxel, a voxel having an attribute value which is obtained from an attribute value of at least one voxel in the neighborhood of the lattice position having no voxel,
wherein the compressing unit performs the lossy compression on the three-dimensional data to which the voxel is added by the adding unit.

14. The encoding device according to claim 9, further comprising:
an adding unit that adds, to a lattice position which are in contact with the voxel and which has no voxel, a voxel having an attribute value which is obtained from an attribute value of at least one voxel in the neighborhood of the lattice position having no voxel,
wherein the compressing unit performs the lossy compression on the three-dimensional data to which the voxel is added by the adding unit.

15. A decoding device comprising:
an input unit that inputs the encoded structure information and the compressed data which are associated with each other and which are output by the encoding device according to claim 9;
a generation unit that generates decompressed data for each lattice position by performing a decompressing process corresponding to the lossy compression on the compressed data; and
a changing unit that changes an attribute value of a lattice position, indicated by the decompressed data to have no voxel, to a value indicating that there is no voxel.

16. A non-transitory computer readable medium storing a program causing a computer to execute a decoding process, the decoding process comprising:
inputting the encoded structure information and the compressed data which are associated with each other and which are output by the encoding device according to claim 9;
generating decompressed data for each lattice position by performing a decompressing process corresponding to the lossy compression on the compressed data; and
changing an attribute value of a lattice position, indicated by the decompressed data to have no voxel, to a value indicating that there is no voxel.

17. A non-transitory computer readable medium storing a program causing a computer to execute an encoding process, the encoding process comprising:
extracting structure information indicating presence/absence of a voxel at each lattice position from three-dimensional data expressing a three-dimensional shape by a collection of voxels which have attribute values, respectively and which are arranged at lattice positions in a space;
generating compressed data by performing lossy compression on the attribute values of the three-dimensional data at the respective lattice positions;
encoding the structure information and determining a structure code corresponding to the structure information of a structure element of interest including at least one adjacent lattice position according to context information, the context information being a value obtained by arranging values indicating presence/absence of a voxel at at least one predetermined lattice position around the structure element of interest in a defined order;

setting a set of a plurality of lattice positions adjacent to each other as the structure element of interest;

encoding the structure information indicating a combination of presence/absence of voxels at the respective lattice positions included in the structure element of interest, using the context information indicating presence/absence of voxels at a plurality of predetermined lattice positions three-dimensionally around the structure element of interest; and outputting encoded structure information including the determined structure code and the compressed data in association with each other.

* * * * *